F. C. GRAY.
ANTISKID CHAIN.
APPLICATION FILED APR. 5, 1919.
1,393,523.
Patented Oct. 11, 1921.
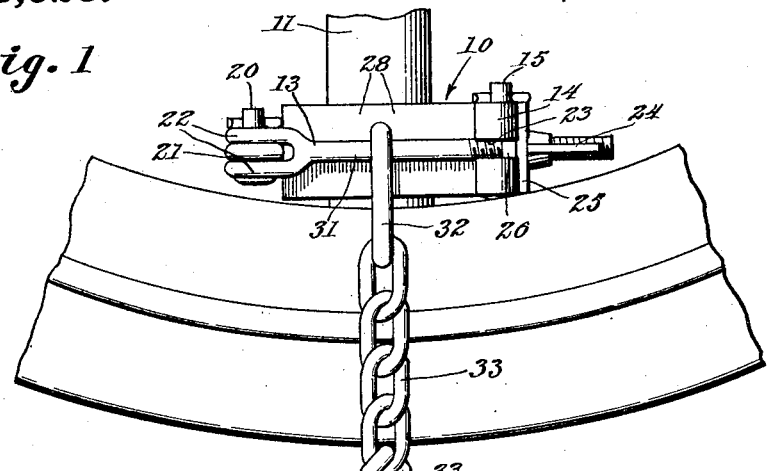
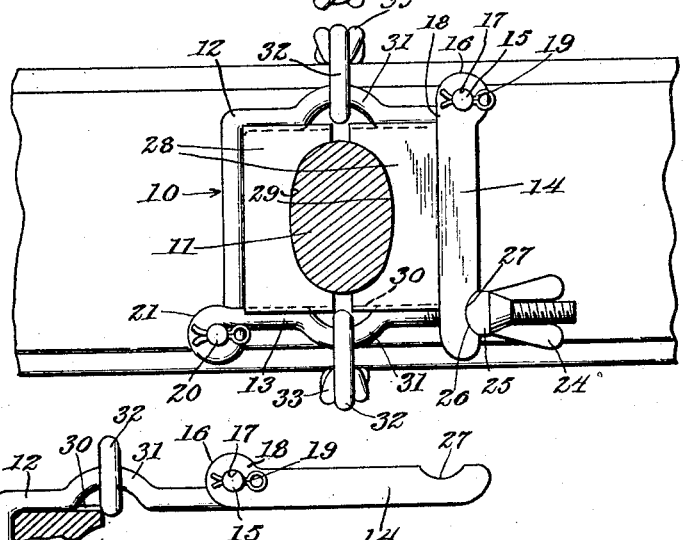
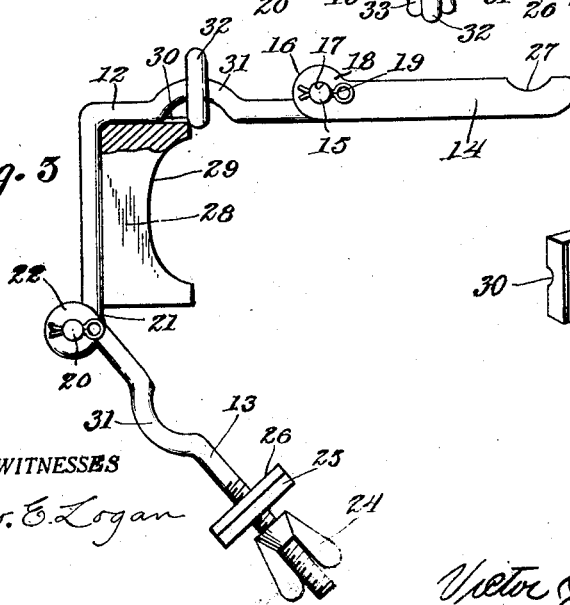
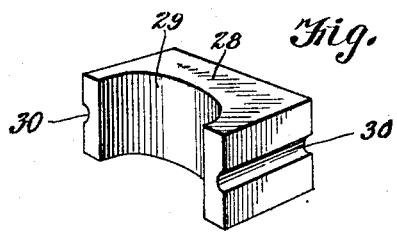
WITNESSES
Geo. E. Logan
INVENTOR.
F. C. Gray
BY
Victor J. Evans ATTORNEY.

UNITED STATES PATENT OFFICE.

FRANCIS C. GRAY, OF COLLEGE CORNER, OHIO.

ANTISKID-CHAIN.

1,393,523.　　　　　Specification of Letters Patent.　　Patented Oct. 11, 1921.

Application filed April 5, 1919. Serial No. 287,768.

*To all whom it may concern:*

Be it known that I, FRANCIS CLAY GRAY, a citizen of the United States, residing at College Corner, in the county of Butler and State of Ohio, have invented new and useful Improvements in Antiskid-Chains, of which the following is a specification.

This invention relates to improvements in non-skid chains for vehicle wheels and aims to provide means whereby one or more chain sections may be removably secured transversely of the tread of the tire.

More specifically stated the invention comprises a clamp which may be removably secured around the spoke of the wheel and have connected thereto a short chain section, one end of which is removable from the clamp, so that the chain section may be quickly and securely connected to or removed from the wheel.

The invention further comprises the following novel features and details of construction, to be hereinafter more fully described and illustrated in the accompanying drawings.

In the drawings:

Figure 1 is a fragmentary elevation of a portion of a vehicle wheel equipped with the invention.

Fig. 2 is a section taken transversely of the spoke and looking down on the clamp.

Fig. 3 is a detail plan view of the clamp in open position with portions thereof broken away.

Fig. 4 is a detail perspective view of one of the filler blocks.

Referring to the drawings in detail, like characters of reference denote corresponding parts throughout the several views.

The invention is designed for application to the wheels of motor driven vehicles for the purpose of securing any desired number of short chain sections transversely of the tire tread and for this purpose there is provided a clamp which is indicated in its entirety by the numeral 10. This clamp is designed to embrace a spoke 11 of a wheel and comprises a substantially L-shaped arm 12, a pivoted arm 13 and pivoted arm 14. The last mentioned arm is pivotally secured to one end of the L-shaped arm 12 by means of a pin 15, which passes through an eye 16 provided in one end of the arm 12 and through alined openings 17, which are formed in spaced lugs 18, located at one end of the pivoted retaining arm 14, the pin 15 being held in position by means of a cotter pin or other suitable fastening device 19. The pivoted arm 13 is secured to the opposite end of the arm 12 by means of a pin 20, which passes through an eye 21 provided at the end of the said arm 12 and through spaced apertured ears 22 provided at one end of the arm 13. The opposite end of the last mentioned arm is threaded and is adapted to be received within a slot 23 formed in the free end of the arm 14 and to be held in position within the slot through the medium of a thumb nut 24 and a locking washer 25. This washer embraces the end of the arm 13, bridging the slot 23, and has its inner face rounded, as shown at 26, for engagement with a similarly shaped notch 27 provided in the end of the arm 14. By this means the clamp is quickly positioned around or removed from the spoke 11.

The clamp 10 is preferably of rectangular shape and in order to securely grip the spoke there is provided a pair of filler blocks 28, the opposed faces of which are formed with curved notches 29 for engagement with the opposite sides of the spoke 11, the blocks 28 being so proportioned as to tightly grip the spoke when the clamp is secured in position. Each end of the block 28 is grooved, as shown at 30, the arm 13 and the opposite portion of the arm 12 being received within these grooves, so as to prevent relative lateral movement of the filler blocks and clamp. The arm 13 and the opposite portion of the arm 12 are each provided with outwardly curved portions 31 for the accommodation of elongated links 32 carried by each end of the non-skid chain section 33.

When in use the chain section 33 is positioned transversely of the tread of the tire and the clamp is locked in position, as shown in Figs. 1 and 2. When it is desired to remove the chain the nut 24 is loosened and the arm 13 disengaged from the slot of the arm 14, the link 32 which engages the arm 13 being of sufficient size to permit of the passage of the nut 24. The chain 33 may then be easily removed. The chain may be of any desired length or thickness and any number of these chains may be positioned around the tire of the wheel. They may be very quickly and easily secured to or removed from the wheel and when not in use require very little space for storage.

The invention is susceptible of various changes in its form, proportions and minor details of construction and the right is herein reserved to make such changes as properly fall within the scope of the appended claims.

Having described the invention, what is claimed is:

1. A clamp comprising a substantially L-shaped member, a pair of pivoted arm secured to the opposite ends of said member, opposed filler blocks adjustably secured within the clamp and coöperating with said arms to receive the article to be clamped, and means for detachably connecting the arms and forcing said blocks together.

2. A clamp comprising a substantially L-shaped member, a pair of pivoted arms secured to the opposite ends of said member and adapted to be disposed directly opposite the two portions of the L-shaped member respectively, one of said arms and said opposite portion of the L-shaped member being provided with outwardly curved portions for accommodations of link members, opposed filler blocks adjustably secured within the clamp and coöperating with said arms to receive the article to be clamped, and means for detachably connecting the arms and forcing said blocks together.

3. A clamp comprising a substantially L-shaped member, an arm having one end provided with spaced apertured ears pivotally connected to one end of said L-shaped member and having its opposite free end threaded, an arm pivotally connected to the opposite end of said L-shaped member, having a slotted outer end for the reception of the other arm and provided with notches to define seats, opposed filler blocks adjustably secured within the clamp and coöperating with said arms to receive the article to be clamped, a locking washer carried by the threaded outer end of the first mentioned arm and adapted to bridge the slotted end of the second mentioned arm and engage the notches aforesaid, and a thumb nut engaging said washer and adapted to force said filler blocks together.

In testimony whereof I affix my signature.

FRANCIS C. GRAY.